Feb. 20, 1934. R. S. SANFORD 1,947,880

BRAKE

Original Filed Jan. 18, 1928

INVENTOR.
ROY S. SANFORD
BY
M. W. McConkey
ATTORNEYS.

Patented Feb. 20, 1934

1,947,880

UNITED STATES PATENT OFFICE 1,947,880

BRAKE

Roy S. Sanford, South Bend, Ind., assignor to Bendix Brake Company, South Bend, Ind., a corporation of Illinois Original application January 18, 1928, Serial No. 247,505. Divided and this application December 3, 1930. Serial No. 499,681

5 Claims. (Cl. 188—204)

This invention relates to brakes and is illustrated as embodied in a four wheel brake system.

The present invention is a division of my pending application Serial No. 247,505, filed January 18, 1928.

An object of the invention is to provide means for operating a four wheel brake system with equalized pressure on the respective brakes.

Another object of the invention is to provide means for selectively applying either two or four brakes with equalized pressure.

A further object of the invention is to provide a simple and powerful means for operating brakes which is highly efficient in operation and yet of marked simplicity as a whole and in respect to each of its component parts, so that its manufacture may be economically facilitated both as regards to parts and their assembly.

Other objects of the invention will appear from the following description taken in connection with the drawing which forms a part of this specification, and in which.

Figure 1:
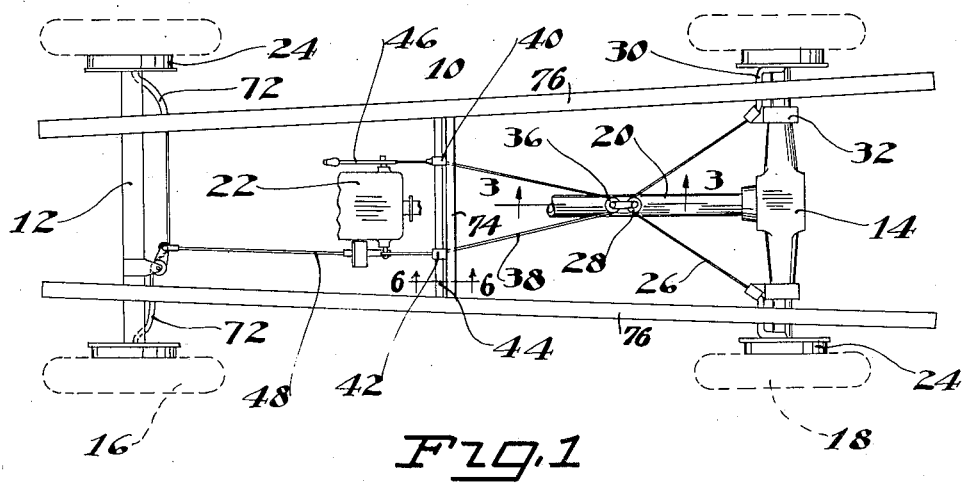
Figure 1 is a top plan view of a motor vehicle chassis illustrating the invention as applied.
Figure 2:
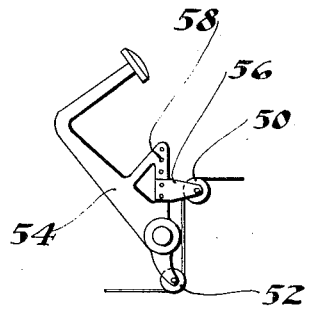
Figure 2 is a side elevation illustrating a brake pedal and connections thereto.
Figure 3:
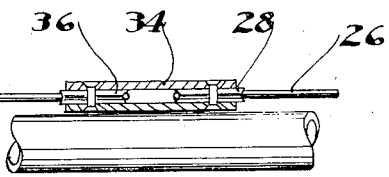
Figure 3 is a sectional view substantially on line 3—3, of Figure 1.
Figure 7:
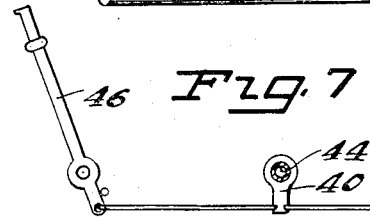
Figure 4:
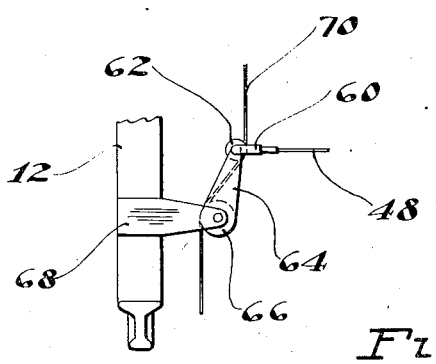
Figure 4 is an enlarged top plan view of part of the applying means on the front axle.
Figure 5:
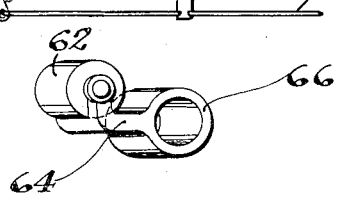
Figure 5 is a perspective view of an operating lever on the front axle.
Figure 6:
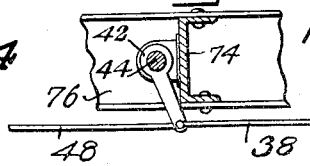

Figure 6 is a view in vertical section and on an enlarged scale taken substantially on the line 6—6 of Figure 1; and Figure 7 is a view in vertical section showing the connection between the hand lever 46 and the cross shaft 44.

In the illustrated embodiment, a motor vehicle chassis includes the usual frame shown generally at 10 supported by springs, not shown, on a front axle 12 and a rear axle 14, the axles having thereon the usual front wheels 16 and rear wheels 18. The rear wheels are driven by the usual propeller shaft 20 through a suitable transmission 22, and all four wheels are provided with brakes indicated at 24.

The brakes for the rear wheels are operated by means such as a cable 26 or the like connected between the brakes. The cable 26 passes over a pulley 28 and its opposite ends extending through suitable conduits 30 supported between the backing plates of the brakes 24 and brackets 32 on the axle 14.

The pulley 28 is supported between two plates 34. These plates also support a pulley 36. A cable 38 is adapted to travel on the pulley 36, and this cable is connected at its respective ends to arms 40 and 42 loosely mounted or sleeved on a cross shaft or support 44. The arm 40 is connected to a hand or emergency brake lever 46 provided with the usual ratchet locking means, not shown.

The arm 42 is connected to a cable or a like flexible means 48. This cable passes over and under pulleys 50 and 52 positioned on a service pedal 54 above and below the fulcrum of the pedal which may be located on the transmission casing 22. As shown, the pulley 50 is supported by a bracket 56 adjustably secured to the pedal lever as indicated at 58. The cable 48 is connected to a clevis 60 having in its forked end a pin or spindle supporting a pulley 62 and an arm 64. The arm 64 has an enlarged sleeve 66 pivoted to a bracket 68 positioned on the front axle 12. A cable 70 for operating the front brakes passes over the pulley 62 and under the enlarged sleeve 66, the respective ends of the cable 70 being passed through suitable conduits 72 and connected to the brakes on the front wheels.

It will be observed that by depressing the pedal 54, all four brakes may be applied with equal pressure, whereas application of the emergency lever applies the two rear brakes only. To insure the latter operation, the arm 42 may be mounted in any suitable manner, so that while it is free to swing forward when the pedal is depressed, it is checked or stopped against rearward movement when the emergency lever 46 is operated. To insure this, a suitable stop is provided for the arm 42. The stop may be formed if desired, as shown, by a cross rail 74 secured to the said rails 76.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake control system comprising two sets of brakes, a cross cable connecting one set of brakes, a cross cable connecting the other set of brakes, rock levers, a cable connecting the rock levers to one of the cross cables, means for actuating one of the rock arms to impose tension on one of the cross cables, a cable connecting the other rock lever to the other cross cable and means including a brake pedal lever for imposing tension on the cables connecting the cross cables.

2. A brake control system comprising two sets of brakes, a cross cable connecting one set of brakes, a cross cable connecting the other set of brakes, a shaft between the cross cables, rock arms on the shaft, a cable connecting the rock arms to one of the cross cables, means limiting movement of one of the rock arms, means for rocking the other rock arm to impose tension on the cable connecting the arms, a cable connecting the rock arm having a limited movement to the other cross cable and means including a brake pedal lever for imposing tension on the cables connected to the cross cable.

3. A brake control system comprising a cross cable connecting a rear set of brakes, a cross cable connecting a front set of brakes, a shaft between the cross cables, rock arms on the rock shaft, a cable connecting the rock shafts to the cross cable for the rear brakes, means for limiting the movement of one of the rock shafts, means for rocking the other rock shaft including a hand lever, a cable connecting the rock shaft having a limited movement to the cross cable connecting the front set of brakes, a foot pedal lever and torsional means on the foot pedal lever for imposing tension on the cables connected to the cross cables.

4. A brake system for a vehicle having pairs of front and rear brakes comprising a cable interconnecting the front brakes, a cable interconnecting the rear brakes, a pedal, a lever, a tension means having one end connected to the front brake cable and having the other end secured to said lever, said tension means intermediate its ends operatively engaging said pedal and said rear brake cable.

5. A brake system for a vehicle having a pair of front brakes and a pair of rear brakes comprising a cable connecting the front brakes, a cable connecting the rear brakes, a lever, tension means having one end secured to the lever and having the other end connected to the front cable, and means slidably connecting an intermediate portion of said tension means to the rear cable.

ROY S. SANFORD.